United States Patent [19]

Dudley et al.

[11] 4,328,416
[45] May 4, 1982

[54] SEAM TRACKER FOR AUTOMATIC WELDER

[75] Inventors: Jerry E. Dudley, New Orleans; Carrol G. Thornton, Slidell, both of La.

[73] Assignee: J. Ray McDermott & Co., Inc., New Orleans, La.

[21] Appl. No.: 90,297

[22] Filed: Nov. 1, 1979

[51] Int. Cl.³ ............................................. B23K 1/00
[52] U.S. Cl. .................................... 250/202; 318/577
[58] Field of Search ................. 250/561, 202; 318/577

[56] References Cited

U.S. PATENT DOCUMENTS

| | | |
|---|---|---|
| 3,748,426 | 7/1973 | Stanley . |
| 3,748,433 | 7/1973 | Gwin et al. . |
| 3,918,622 | 11/1975 | Larson . |
| 4,145,593 | 3/1979 | Merrick et al. . |
| 4,158,124 | 6/1979 | Connell . |
| 4,158,161 | 6/1979 | Suzuki . |

OTHER PUBLICATIONS

Larson, "Automatic O.D. Bellows Welder Principle and Description", Bailey Belfab (Feb. 4, 1974).
"Seam Tracker Systems", Cyclomatic Industries, Inc. (Feb. 1976).
King et al., "Seam Tracking Systems with the Arc as Sensor".

Primary Examiner—David C. Nelms
Assistant Examiner—Darwin R. Hostetter
Attorney, Agent, or Firm—Arnold, White & Durkee

[57] ABSTRACT

Apparatus for non-contact tracking of a weld seam to provide lateral position guidance of a welding torch advanced along the weld seam by a traveling carriage utilizes an electromagnetic radiation source for directing an unfocused beam onto the weld seam producing a spatial distribution of reflected electromagnetic radiation having an optical center of power the location of which is functionally related to the lateral position of the welding torch relative to the weld seam, and a lateral cell position sensor for sensing a shift in position of the optical center of power of the reflected electromagnetic radiation spatial distribution. Detection of a shift in position of the optical center of power is utilized as an indication of lateral deviation of the welding torch relative to the weld seam.

The apparatus disclosed further includes signal processing circuitry that develops an electrical signal indicative of welding torch position for input to a torch drive servomechanism. The signal processing circuitry includes noise rejection circuitry to suppress torch light effects on the position sensor and circuitry to reject the RF characteristic of the welding ARC.

18 Claims, 15 Drawing Figures

SEAM TRACKER FOR AUTOMATIC WELDER

BACKGROUND OF THE INVENTION

The present invention relates to automatic welding equipment having a welding torch which is advanced along a weld seam during a welding operation by a traveling carriage riding on a track member; and more particularly, the present invention relates to apparatus for providing accurate tracking of the weld seam by the welding torch as it is advanced.

In order to enhance the progress of construction operations which involve an extensive use of welding operations, attempts have been made to automate welding processes. The automation of welding processes involves a transfer from a manual welder to a machine of those functions that relate to the parameters affecting formation of a weld. Accordingly, welding machines developed in an effort to obviate manual welding have provided programmed control for torch advancement, welding power-current and voltage, filler wire feed, torch oscillation, and gas flow in the case of a tungsten inert gas (TIG) welding process.

In addition to the above parameters, another aspect in weld formation is that of guidance of the welding torch along the weld seam as the torch is being advanced. As a result of the difficulty in providing accurate automatic tracking control of a weld seam, it has been the case that a welding machine operator has been required to visually monitor the welding process as it proceeds and manually adjust the lateral positioning of the welding torch relative to the weld seam to correct for deviations of the torch from the desired weld path. Accordingly, seam tracking is a basic prerequisite for complete automation of the entire welding process.

Various techniques for tracking a weld seam have been proposed. For example, mechanical seam trackers have been developed which employ a guide probe having one end adapted to be engaged in and follow the joint between two workpieces to be welded and the opposite end mounted for universal movement within a housing mounted to a traveling carriage to which the welding torch is mounted. Also included within the housing is an electromechanical sensor for developing an electrical signal in response to manipulation by the end of the guide probe mounted to the housing. Accordingly, if during the welding process the welding torch begins a lateral deviation from the weld seam to be tracked, the guide probe is altered in its orientation resulting in an electrical signal being developed which can be utilized as a feedback signal to a torch lateral position drive mechanism on the traveling carriage. Mechanical seam trackers, however, are unsatisfactory for use with a welding process which involves a number of filler passes; because, as the last filler pass is made, there is insufficient weld seam sidewall available for the guide probe to track.

It has also been proposed that weld seam tracking be accomplished by monitoring the welding current supplied to the welding torch. In seam tracking apparatus of this type, the welding current is measured, using a shunt resistance to develop a representative signal amplitude. The measured current value is compared with a predetermined reference value and the difference used as a control signal to a mechanism on the traveling carriage for adjusting the lateral position of the welding torch. Changes in the lateral positioning of the welding torch relative to the weld seam effects an alteration of the welding current, leading to the generation of a lateral torch position feedback signal. A problem exists, however, in using torch welding current as the control variable in that changes in the welding current can also be effected by other occurrences, most notably variations in the vertical distance between the welding torch and the workpiece. And even though separate welding torch height adjustment control may be provided, error will nevertheless be introduced into the seam tracking loop.

Another approach to providing non-contact tracking of a weld seam is that disclosed in U.S. Pat. No. 3,918,622. The apparatus disclosed therein is a stationary optical system in which light from a projector lamp is focused by a condenser lens onto a mirror located beneath and directly behind the welding torch and reflected downward to the weld seam. Light reflected from the weld seam is directed by the same mirror to a lens which focuses the light into an image of the weld seam and directs the image onto a split-screen sensor consisting of two photovoltaic cells separated by a narrow gap. The outputs of the cells are applied as inputs to a differential amplifier circuit, the output of which controls the lateral positioning of the welding torch by selective actuation of a stepping motor and drive mechanism.

If the focused line image is centered on the gap between the sensor elements with equal portions of the image falling on each sensor, the input signals to the differential amplifier are equal and no signal is applied to the stepping motor. If, however, the welding torch begins to deviate from the prescribed welding path, the focused line image moves, placing unequal portions of the image on the sensors, and causes an imbalance in the input signals to the differential amplifier. The sign (i.e. positive or negative) of the differential amplifier output indicates the direction, left or right, of the deviation, and the signal magnitude indicates the extent of deviation.

To completely automate the welding process, there is a need for apparatus which will provide accurate automatic tracking control of the weld seam by a welding torch as it is advanced without any involvement from a manual operator. Such need is particularly acute in the construction of pipelines for transporting crude oil, refined petroleum products, natural gas, and similar products from a point of origin to a processing or distribution center. Such pipelines are constructed by adjoining numerous pipe sections, typically on the order of 30–36 inches in diameter, to form a pipeline several miles in length. Particularly in the construction of offshore pipelines has the need for fully automated welding been felt. However, because of the existence of a relatively narrow weld seam in comparison to the diameter of the pipe sections to be welded, the requirement for multiple passes and a filler wire, and the necessity of mounting the welding torch on a movable carriage, it has heretofore not been possible to suitably provide automatic tracking of a weld seam in fabricating such pipelines. Accordingly, manual guidance of a welding torch along the weld seam has been almost exclusively employed.

SUMMARY OF THE INVENTION

In accordance with the present invention, there is provided non-contact seam tracking apparatus for accurate position control of a welding torch relative to a weld seam. More particularly, the seam tracker of the present invention provides for the accurate maintenance of a welding torch in the center of the weld seam during a welding pass.

The seam tracker of the present invention detects lateral, off-center deviations of the welding torch from a weld seam by sensing a shift in position of the optical center of power of a spatial distribution of electromagnetic radiation reflected from the weld seam, the spatial distribution being functionally related to the lateral positioning of the welding torch relative to the weld seam. In accordance with the present invention, an unfocused beam of electromagnetic radiation is directed onto the weld seam and reflected therefrom in an unimaged spatial distribution or power pattern. A shift in position of the optical center of power of the reflected electromagnetic radiation upon a variation in the spatial distribution of the reflected electromagnetic radiation period is detectable by a lateral cell position sensor providing an electrical signal indicative thereof.

The non-contact seam tracker of the present invention is suitable for use in welding apparatus in which a welding torch assembly is secured to a traveling carriage riding upon a track assembly mated to a guide band installed on a workpiece a predetermined distance from the weld seam and positioned to align the torch assembly in a plane parallel to the weld seam. For example, the seam tracker of the present invention may be advantageously utilized in the automatic welding of large diameter, thick wall pipe sections using tungsten inert gas (TIG) type welding, wherein the welding torch is oscillated relative to the weld seam as it is being advanced around the pipe.

In the utilization of the non-contact seam tracker of the present invention in an automatic welding system wherein a drive mechanism positions the torch in response to an electrical control signal, the seam tracker includes signal processing electronics for developing from the electrical output signal of the lateral cell position sensor a suitable input signal to the torch drive mechanism.

Such signal processing includes, in accordance with the present invention, apparatus for effecting a rejection of noise in the position sensor output. To effect a rejection of noise, the electromagnetic radiation source is periodically pulsed on and off with uniform symmetry. In coincidence with the source on-time periods, the sensor output signal is monitored and a value representative thereof is stored, the output signal comprising a signal component and a noise component. During the source off-time period that follows each on-time period, the sensor output signal is sampled, and the stored value is reduced in an amount corresponding to a value representative of the off-time sensor output. Absent a contribution by the electromagnetic radiation source, the sensor output will be representative of the noise component only, therefore the remaining stored value after reduction will be representative of the information signal only.

In applying the seam tracker of the present invention to an automatic welding system wherein the welding torch is mounted on a traveling carriage, the electromagnetic radiation source and lateral cell position center may be mounted in a housing carried adjacent the welding torch and disposed above the weld seam. That is, the electromagnetic radiation source and position sensor are fixed relative to each other and both are displaced relative to the welding torch upon lateral deviation of the welding torch.

BRIEF DESCRIPTION OF THE DRAWINGS

A more complete appreciation of the invention may be had by reference to the accompanying drawings, illustrating a preferred embodiment of the invention, wherein.

DETAILED DESCRIPTION OF AN ILLUSTRATIVE EMBODIMENT

Figure 1:
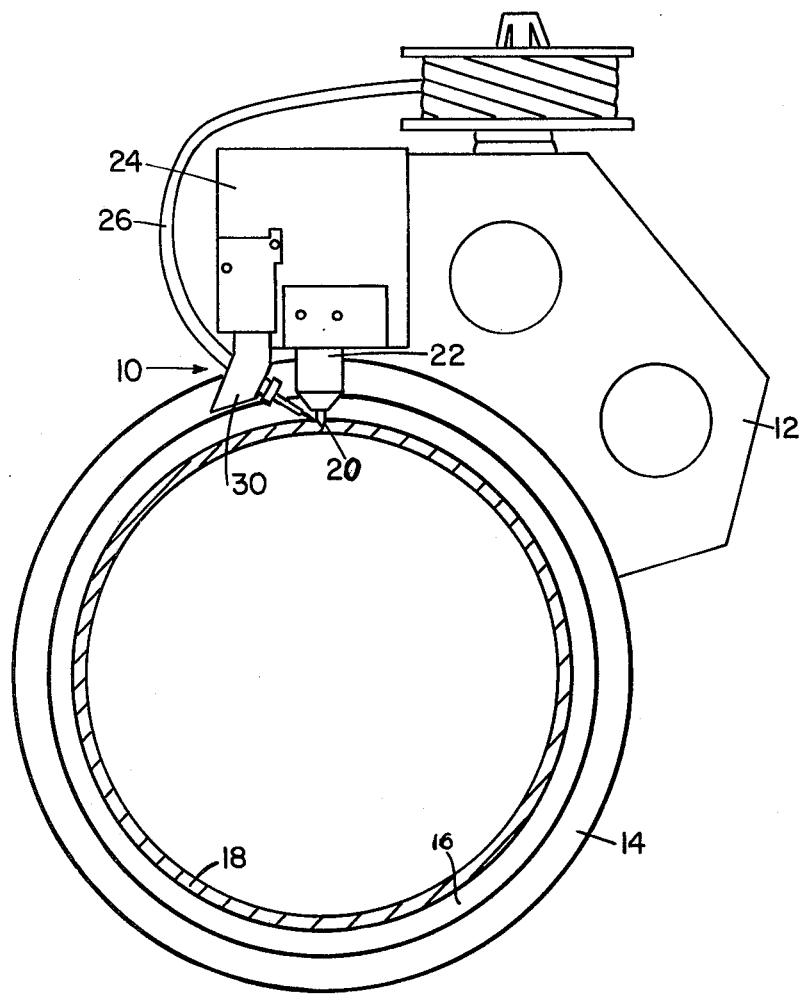
FIG. 1 is a view of a welding system in which a welding torch is circumferentially advanced by a track mounted carriage about a pipe section to be welded.

Referring first to FIG. 1, a welding torch assembly 10 is adapted to be secured to a traveling carriage 12 which rides upon a track assembly 14 that mates to a guide band assembly 16 installed on a workpiece 18 to be welded. The track assembly provides the traveling carriage with a prepared surface upon which to travel. Drive rollers on the carriage constitute the prime mover for the carriage, propelling it along the track. The guide band assembly may be a steel band installed on the workpiece a predetermined distance from the weld seam and positioned to align the torch assembly in a plane parallel to the weld seam. In the illustrative embodiment being described, the workpiece having the guide band assembly mounted thereon is a large diameter (e.g. 30-36 inches), thick wall (e.g. 1 inch) pipe section. The torch assembly 10 comprises a tungsten electrode 20 and torch housing 22 having gas supplied thereto to provide a trailing gas shield surrounding the tungsten electrode in the weld area.

The torch assembly 10 is mounted on the carriage in a manner which permits lateral movement thereof with respect to the weld seam, i.e., motion across the weld seam. Lateral movement of torch assembly 10 across the weld seam is by means of a motor and drive mechanism in torch mount 24, which provides for adjustment of the lateral positioning of the welding torch and for oscillation of the welding head if desired.

Additionally, a seam tracker assembly 30 is secured for movement with the torch assembly as a unit. Also, filler wire 26 is made available adjacent electrode 20 for consumption during the welding process.

Figure 2:
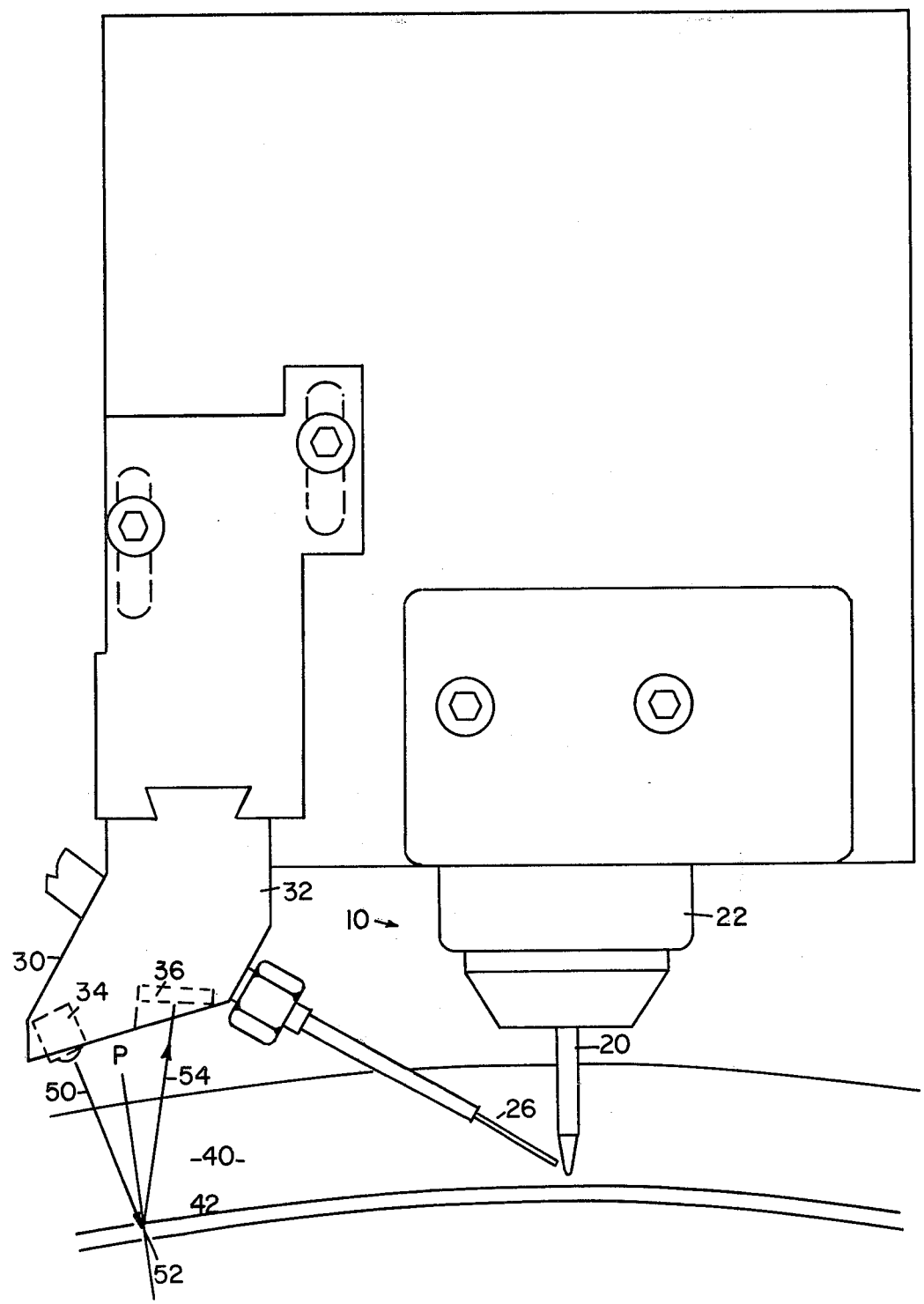
FIG. 2 is a diagram of a welding torch assembly in position for welding a beveled pipe section, and having a housing mounted thereto containing an electromagnetic radiation source for directing a beam into the weld groove and a position sensor for receiving reflected electromagnetic radiation from the workpiece.

Seam tracker head assembly 30 is carried adjacent to the torch assembly and functions to maintain the tungsten electrode of the torch in the center of the weld seam. Referring to FIG. 2, seam tracker head assembly 30 includes a source 34 of electromagnetic radiation and an electromagnetic radiation sensor 36. Additionally, the seam tracker includes signal processing electronics such that a closed loop servo system is created. The seam tracker apparatus thus develops a control input to the control system for the motor which actuates the drive mechanism that moves the torch assembly laterally of the weld seam.

In this discussion of an illustrative embodiment of the present invention, the discussion is being developed in connection with the welding of two abutting large diameter, thick wall pipe sections which form a circumferential weld seam and define a required welding path for the torch assembly to follow. To further define the circumstances of the welding problem to which the seam tracker apparatus of the present invention is being illustratively applied, attention is directed to FIG. 3 which shows a cross-section view of a weld seam formed by the abutment of two pipe sections having their ends prepared as a "J" bevel. As will be readily understood by those in the pipeline welding art, a "J" bevel has weld seam sidewalls extending at an angle of four degrees with respect to vertical and has a surface gap width of 0.350 inches. Additionally, abutting ends prepared as a "J" bevel when properly aligned in an abutting relationship form a weld seam floor, a portion of which extends perpendicular to vertical and parallel to the inner and outer pipe section surfaces. As can be appreciated from the diagram of FIG. 3, the gap to be filled by welding is relatively deep in comparison to its width.

As stated already, the seam tracker functions to maintain the welding torch electrode 20 in the center of the weld seam, and if the torch is being oscillated back and forth across the weld seam during welding, the seam tracker serves to maintain the center of the oscillation at the center of the weld seam. Thus, while the carriage is being advanced along a path on a workpiece, guided by the guide track assembly, the seam tracker independently guides the lateral position of the welding torch.

In order to track a weld seam, it is required that information regarding torch lateral position deviation over a time interval be obtained and processed into something which can be utilized within the torch lateral positioning control system. The seam tracker being described herein develops the required information for processing by producing an unimaged spatial distribution of electromagnetic radiation reflected from the weld seam, which is functionally related to the lateral positioning of the path being traveled by the welding torch relative to the weld seam. Variations in the spatial distribution resulting from lateral position deviations of the welding torch from a prescribed path along the weld seam are sensed and an input signal into the welding torch lateral drive servo mechanism is developed.

In the illustrative embodiment being described herein, a spatial distribution, or radiant power pattern, of electromagnetic radiation is created by directing an unfocused beam of electromagnetic radiation into the weld seam from a point source disposed above the floor 42 of the groove formed by the abutting beveled ends of pipe sections 44, 46 which constitutes the weld seam. Electromagnetic radiation directed into the weld seam is reflected off the floor 42 and spatially distributed as a function of the lateral position of the point source and sensor relative to the weld seam.

In the embodiment shown in the attached drawings and being described herein, the source 34 of electromagnetic radiation is an infrared light emitting diode. One such suitable device is a type OP-133 gallium-arsenide LED which has its peak power output at a wavelength of 940 nanometers. An electromagnetic radiation source of this type is highly directional having a radiant energy pattern in which radiant intensity falls off rapidly with angular displacement from the optical axis of the device. Thus, although source 34 emits infrared light in divergent rays, the divergence is not great; the beam can be visualized as a cone, the apex of which is the origin of the infrared light rays.

As shown in FIG. 2, electromagnetic radiation source 34 is canted at an angle with respect to a line perpendicular to weld seam floor 42. In accordance with the law of incidence, incidence ray 54 is reflected from point 52 as reflected ray 54. The angle between reflected ray 54 and a line perpendicular to floor 42 (the plane of incidence) is equal to the angle between incident ray 50 and the perpendicular.

Figure 5:
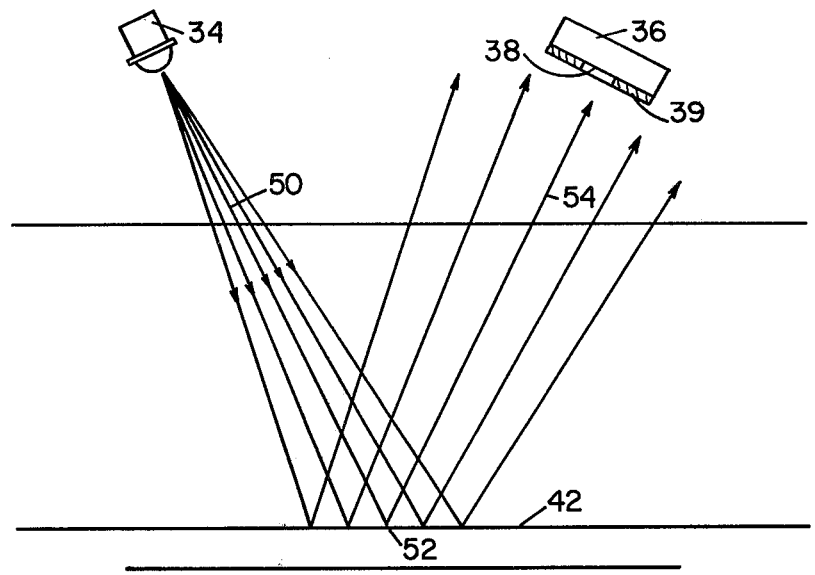
FIG. 5 is a two-dimensional diagram of the spatial distribution in the vertical plane of electromagnetic radiation from a point source reflected from a plane surface.

The infrared light ray representations shown in FIG. 2 represent only that light ray which propagates along the optical axis of source 34. As mentioned, electromagnetic radiation emitted from source 34 is divergent. In FIG. 5, there is presented a more accurate representation of the spatial distribution of reflected electromagnetic radiation emitted from source 34 and reflected off surface 42. It will, of course, be appreciated that the representation in FIG. 5 is two dimensional only, with incident rays 50 and reflected rays 54 lying in a plane running longitudinally of the weld seam and extending perpendicularly from surface 42.

As may be seen in FIG. 5, the divergent rays emitted from source 34 will, upon being reflected off surface 42, continue to diverge and spread. Since the radiant intensity of electromagnetic radiation is defined in terms of the amount of radiant flux per a given unit area, typically a solid angle designated a steradian, the radiant intensity at a location of specified distance from the source of detected radiant energy will be a function of the divergence of the electromagnetic radiation. Accordingly, if the source of reflected electromagnetic radiation is a device having a rapid fall-off of optical power with angular displacement from the optical axis, such as the referenced light emitting diode, the divergence of the reflected rays accentuates the attenuation of radiant intensity off axis. This results in a spatial distribution of the reflected electromagnetic radiation in which maximum radiant intensity exists along the path of the reflected rays which are produced from incident rays emitted along the optical axis of the source.

Figure 5A:
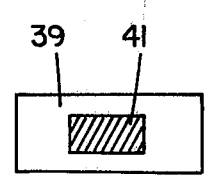
FIG. 5A is a diagram of an optional mask for disposition over the position sensor face.

Accordingly, to maximize the sensitivity of detection of reflected electromagnetic radiation spatially distributed as described and diagramatically illustrated in FIG. 5, a sensor 36 should be oriented to have its receiving surface 38 disposed perpendicular to the reflected rays from surface 42 which result from incident rays on the optical axis of source 34. Such orientation can, of course, be achieved by canting the sensor surface 38 at an angle equaling the angle at which source 34 is disposed. Additionally, the surface 38 of sensor 36 need only have a width sufficient to receive the reflected off axis rays of a minimum optical power. For example, reflected rays produced by incident rays at angular displacements from the optical axis of source 34 which are below the half-power points on the radiant intensity-angular displacement curve of FIG. 4 can be ignored and the size of the sensor reduced accordingly by masking. A suitable mask 39 having a rectangular opening therein and an optional torch light polarizing filter 41 is shown in FIG. 5A. Masking increases resolution of the seam tracker by creating a smaller field of view, and also increases the signal to noise ratio. But, there is a trade-off in that signal strength is diminished.

Figure 3:
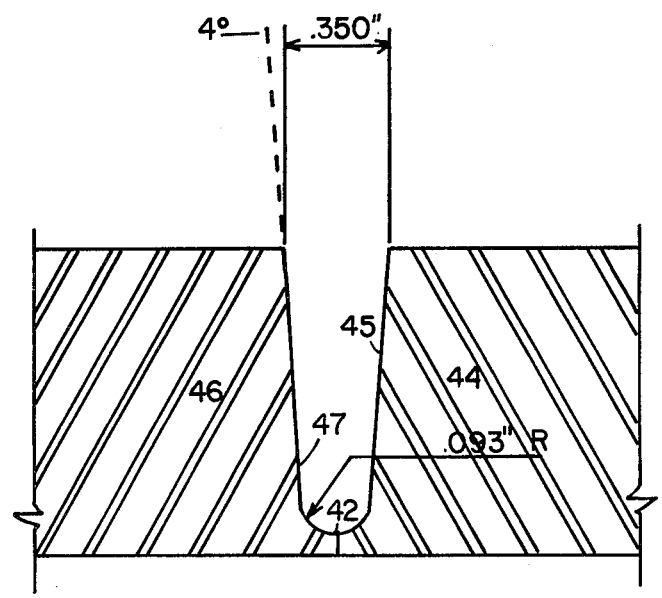
FIG. 3 is a longitudinal cross-section of a portion of the ends of two abutting pipe sections illustrating a representative weld seam which the illustrated embodiment of the present invention will track.

Since electromagnetic radiation emitted from source 34 is divergent in three dimensions, a consideration of the spatial distribution of its reflection from surface 42 within a weld seam like that shown in FIG. 3 requires a consideration of the contribution to the overall resulting electromagnetic radiation spatial distribution attributable to lateral off-axis rays, as opposed to the vertical off-axis rays depicted in FIG. 5.

Figure 6:
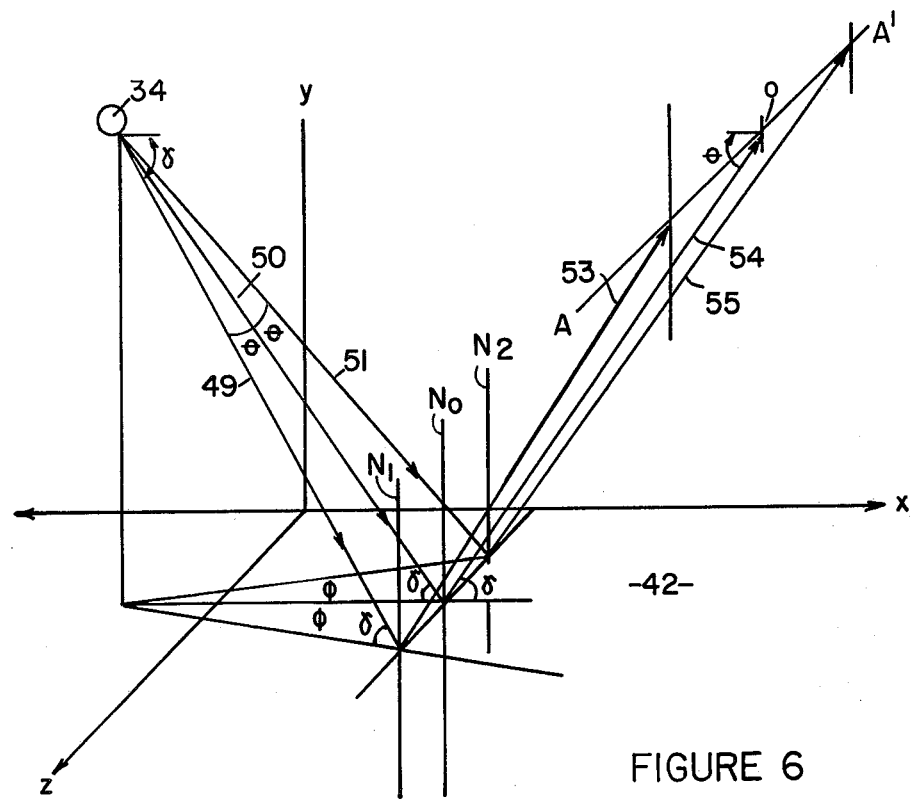
FIG. 6 is a three-dimensional diagram of the spatial distribution of electromagnetic radiation from a point source reflected from a plane surface.

Referring now to FIG. 6, there is presented a three dimensional diagramatic representation of the spatial distribution resulting from the reflection of incident rays emitted from source 34 at lateral angular displacement from the optical axis of the device. As shown, incident ray 50, which is emitted along the optical axis is reflected as reflected ray 54. Reflected ray 54 in FIG. 6 corresponds to reflected ray 54 in FIG. 5, and it intersects with a line A-A' which lies in a plane disposed above the X-Z plane of the referenced coordinate system.

Reflection of lateral off-axis rays 49 and 51 producing reflected rays 53 and 55, respectively, is in accordance with the law of reflection, which provides that the angles between the incident ray and the normal to the reflecting surface and between the reflected ray and the normal are equal. However, it is a further requirement of the law of reflection that the reflected and incident rays lie in a plane which includes the normal. Accordingly, incident ray 49, reflected ray 53 and normal $N_1$ must lie in a common plane. Similarly, incident ray 51, reflected ray 55 and normal $N_2$ must lie in a plane. Thus, while reflected rays 53 and 55 will intersect line A-A', the rays will so intersect as diverging rays.

Accordingly, it can be concluded that the spatial distribution of rays emitted from source 34 at lateral angular displacements from the optical axis will produce a laterally spread electromagnetic radiation distribution or pattern. The power intensity distribution along line A-A' will vary as a function of the optical power output of source 34 along the various angular displacements from the optical axis. The radiant energy pattern about the optical axis of source 34 may be either symmetrical or non-symmetrical.

Figure 4:
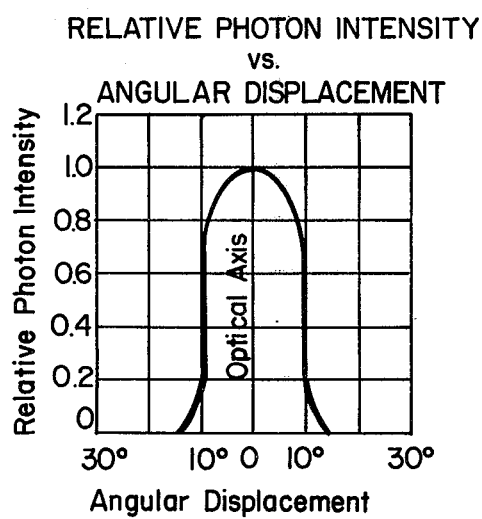
FIG. 4 is a diagram of the radiant energy pattern for the electromagnetic radiation source of the illustrative embodiment.

Inasmuch as FIG. 4 is a representation of radiant intensity versus angular displacement, it is descriptive of the optical power attenuation characteristics of source 34 for both vertical and lateral angular displacements from the optical axis. This is the case because radiant intensity is defined as the radiant flux per unit solid angle in a given direction.

With the radiant energy pattern of source 34 being symmetrical, it follows that the optical power along line A-A' will be a maximum at the point of intersection of reflected ray 54 therewith; to either side of this point of intersection along line A-A', the power will fall-off in accordance with the relationship expressed in FIG. 4. That is, the optical center of power (in the case where the optical axis is aligned vertically with the center of the weld seam,) is at the midpoint of sensor 36.

If, however, the radiant energy pattern of source 34 is non-symmetrical, and the power output does not fall-off appreciably with lateral angular displacement off the optical axis, the optical power distribution along line A-A' will be non-uniform. Moreover, the spatial distribution of the total reflected electromagnetic radiation from surface 42 of the weld seam will be one in which there is a line of maximum intensity extending across the face of sensor 36.

As will be readily appreciated, lateral deviation of source 34 (i.e. movement along the Z axis of the rectangular coordinate system) will effect a similar lateral displacement of the reflected rays intersecting the line A-A'. And there will be an optical change in the spatial distribution or radiation pattern across the sensor 36 face. Such change in spatial distribution produces an effective shift of the optical center of power across the sensor face.

Thus, it would appear to be possible to detect lateral motion of source 34 by sensing the shift in the optical center of power along a line A-A'. Implementation of such concept for determining lateral deviation of source 34 requires a sensor which provides for the measurement of the optical center of power. One suitable device is a lateral cell position sensor providing accurate analog position measurement of a radiant energy power point, such as the SD-1166-21-11-391 device manufactured by Silicon Detector Corporation, Newbury Park, Calif.

Detection of lateral displacement of source 34 using a lateral cell position sensor may be accomplished by positioning the sensor in a fixed location with respect to the torch and source 34, such that lateral movement of the point or area of maximum radiant intensity within the spatial distribution of the reflected electromagnetic radiation along the sensor's axis will produce a measurable response by the sensor.

A fixed sensor arrangement for detecting lateral displacement of source 34 assumes an expansive plane of incidence. However, in the context of a weld seam defined by a groove between abutting workpieces, such as the weld seam diagrammed in FIG. 3, the plane of incidence (i.e. surface 42) is of limited width. Accordingly, an alternative approach to detecting lateral displacement of an electromagnetic radiation source 34 by sensing reflected electromagnetic radiation and ascertaining the shift in optical center of power can be utilized in which the lateral cell sensor position is fixed with respect to the electromagnetic radiation source and moves therewith.

Because a weld seam like that shown in FIG. 3 presents wall surfaces adjacent the weld seam floor 42, electromagnetic radiation directed into the weld seam from an external location will be reflected off surface 42 and the adjacent sidewalls 45, 47. However, rays of electromagnetic radiation reflected off the sidewalls 45, 47 will not be directed so as to impinge upon the surface of the position sensor. Accordingly, if source 34 and sensor 36 shown in FIG. 2 are aligned and positioned with respect to the weld seam so as to place the optical axis of the source/sensor system at the center of the weld seam, i.e. equi-distance between the weld seam walls, the optical center of power will coincide with the optical axis of the system.

As will be readily appreciated, if the electromagnetic radiation source 34 and sensor 36 do not move laterally with respect to the weld seam, as the seam tracker assembly and torch assembly are advanced along by the carriage, the optical axis of the source/sensor reference system will remain at the center of the weld seam and reflected rays of electromagnetic radiation from surface 42 will be of a spatial distribution in which the optical center of power is not shifted across the face of lateral cell position sensor 36. However, if source 34 and sensor 36 deviate laterally from the center of the weld seam, the optical axis of the source/sensor reference system is similarly laterally displaced, and rays or electromagnetic radiation emitted from source 34 which would normally be reflected off surface 42 are instead reflected off the weld seam wall towards which the optical axis has been shifted. Correspondingly, rays of electromagnetic radiation emitted from source 34 which would normally be reflected off the lower portion of the opposite weld seam wall are instead reflected off surface 42. The result of a lateral deviation of the source/sensor reference system is that a different spatial distribution of reflected electromagnetic radiation is established in which the center of optical power is shifted in position on the sensor face.

Position sensor 36 generates welding torch position information in the form of two electrical current signals, the difference in amplitude between the signals being functionally related to the position on the sensor face of the optical center of power. In order to develop a meaningful input to the torch lateral drive mechanism, it is necessary to process the signals, such being most conveniently accomplished electronically.

Figure 7:
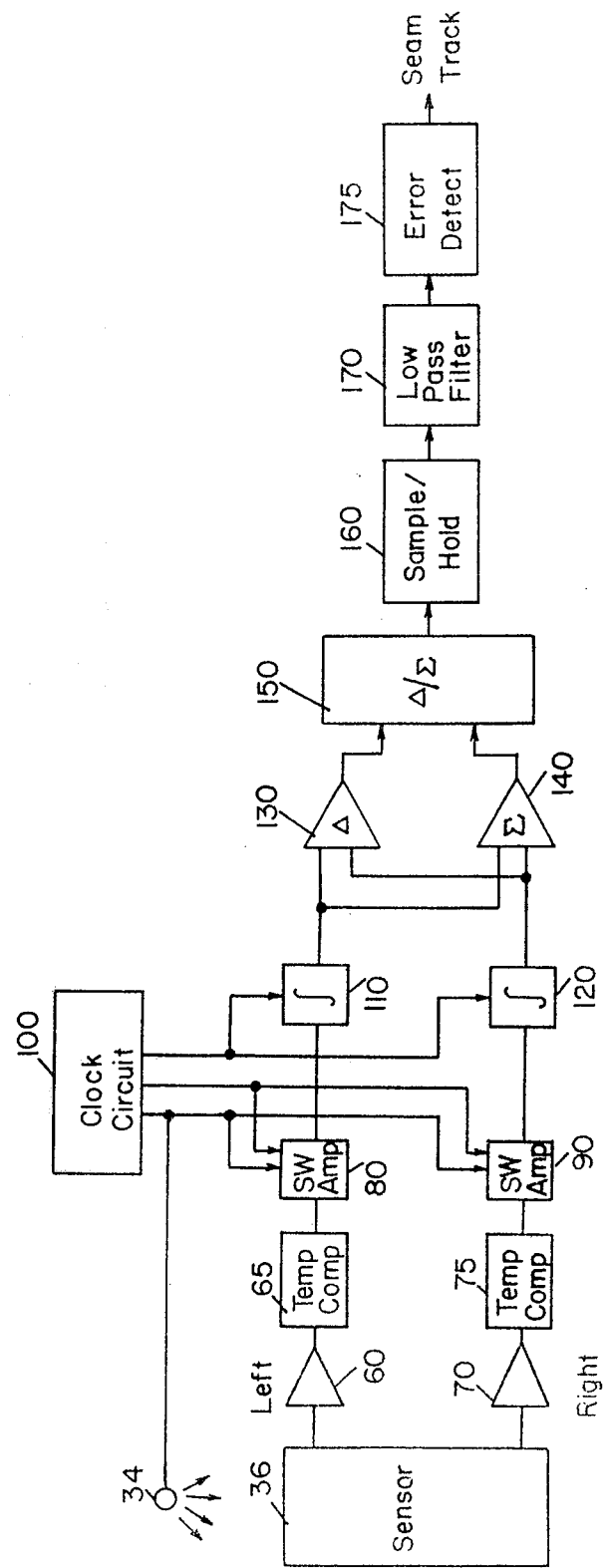
FIG. 7 is a block diagram of the illustrative embodiment of the seam tracker of the present invention emphasizing the signal processing portion thereof.

Referring to FIG. 7, there is shown a functional block diagram of a scheme for processing the differential electrical signals available from sensor 36. Initially, each of the signals, A and B, from sensor 36 are applied to preamplifiers 60, 70 which change the current signal to a voltage signal. As will be explained more fully, preamplifiers 60, 70 are transconductance amplifiers yielding a voltage output. The outputs of preamps 60, 70 are applied via respective temperature compensation circuits 65, 75 to a respective switching differential amplifier 80, 90.

A clock circuit 100 develops the appropriate timing signals for switching amplifiers 80, 90. In addition, clock circuit 100 drives L.E.D. electromagnetic radiation source 34. In fact, the signal from clock circuit 100 which pulses source 34 at a prescribed flashing rate and the oppositely phased signal are applied to switching differential amplifiers 80, 90. By routing the LEFT and RIGHT sensor signal channels through switching differential amplifiers 80, 90 and switching them at the source pulse rate, noise rejection is enhanced.

The output of differential switching amplifier 80 is applied to an integrator 110. Similarly, the output of switching differential amplifier 90 is applied as an input to integrator 120. Both integrators 110, 120 provide an output voltage in a staircase waveform, each step being proportional to the respective signal level applied as the integrator input. The integrators are periodically reset.

The outputs of integrators 110, 120 are applied to a differential amplifier 130, and also applied to a summing amplifier 140. Accordingly, the signals are used to develop two new signals, one being the sum of the LEFT channel and RIGHT channel signals, and the other being the difference of the LEFT channel and RIGHT channel signals.

The sum and difference amplifier outputs are applied to a divider 150 which divides the difference signal by the sum signal. The formation of difference and sum signals and the division thereof develops yet another signal which, though containing torch position information, is insensitive to variations in the electromagnetic radiation source and sensor system, such as vertical heighth over the workpiece and source degradation. Furthermore, choosing a difference to sum ratio signal provides insensitivity to variations in reflectance of the weld seam.

The output of analog divider 150 is applied to a sample and hold amplifier 160, with the output therefrom being applied to a low pass filter 170. The output of the low pass filter is a DC signal proportional in magnitude to the position of the source/sensor system over the weld seam. Additionally, the algebraic sign of the signal indicates the direction, left or right, of lateral deviations of the source/sensor system. Error detect circuitry 175 receives the filter output and provides the SEAM TRACK signal.

Figure 8:
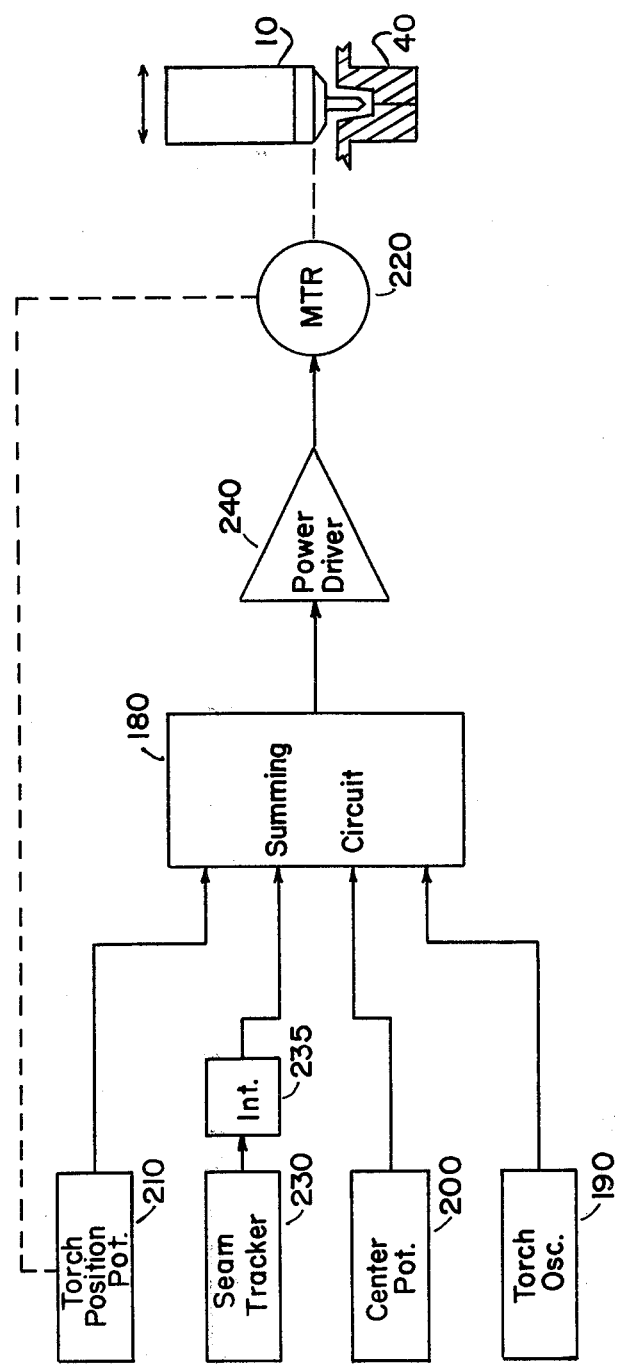
FIG. 8 is a block diagram of a welding torch servo-mechanism control system for driving the torch laterally in a prescribed fashion, including a seam tracker input thereto derived in accordance with the illustrative embodiment of the present invention.

The output signal SEAM TRACK is applied as an input to the torch positioning servo loop mechanism shown in FIG. 8. Typically, in welding pipe sections to form a pipeline, the welding torch will be oscillated back and forth across the weld seam in accordance with predetermined control settings for the oscillator excursion. In such case, the seam tracker input serves to maintain the center of oscillation at the center of the weld seam. The torch positioning servo mechanism in the diagram of FIG. 8 is for automatically moving the torch position back and forth to create torch oscillations. Summing circuit 180 receives torch position control inputs. The torch inputs are a torch oscillation signal from torch oscillator 190. Typically, the torch oscillator will be programmable to provide a trapezoid waveform having a predetermined excursion time, dwell time, and amplitude. An initial centering signal is also input to summing circuit 180. Initial centering of the welding torch over the weld seam to establish the center of torch oscillation is provided by centering potentiometer 200. Torch lateral position information is developed by a torch position potentiometer assembly 210 mechanically interconnected with the output shaft of oscillator motor 220. Finally, the signal developed by seam tracker 230 is input to summing circuit 180 via integrator 235.

If the welding torch is properly centered with respect to the weld seam, the output of summing circuit 180 will be an error signal indicating the difference between the existing lateral torch position and the desired position as prescribed by the torch oscillator signal. The error signal from summing circuit 180 is applied to a power driver 240 providing current drive to torch oscillator motor 220. If, however, the welding torch begins to move off-center with respect to the weld seam (i.e. the center of oscillation is laterally displaced), the error signal output from summing circuit 180 will be modified to reflect the discrepancy between the center of oscillations of the welding torch and the initial center established by the setting of center potentiometer 200.

It is to be understood that application of the seam tracker being described herein to the problem of maintaining torch position with respect to a weld seam in which the torch is being oscillated back and forth across the weld seam requires that the seam track signal developed in accordance with the processing apparatus diagrammed in FIG. 7 be electronically integrated by integrator 235 to remove the effect of torch oscillation and render the seam tracker insensitive to such oscillations. That is, the contribution to the seam track signal from torch oscillations is filtered from the seam track signal available from low pass filter 170.

With reference now to FIGS. 9-14, specific circuitry for implementing the processing apparatus diagrammed in FIG. 7 will be described.

Figure 9:
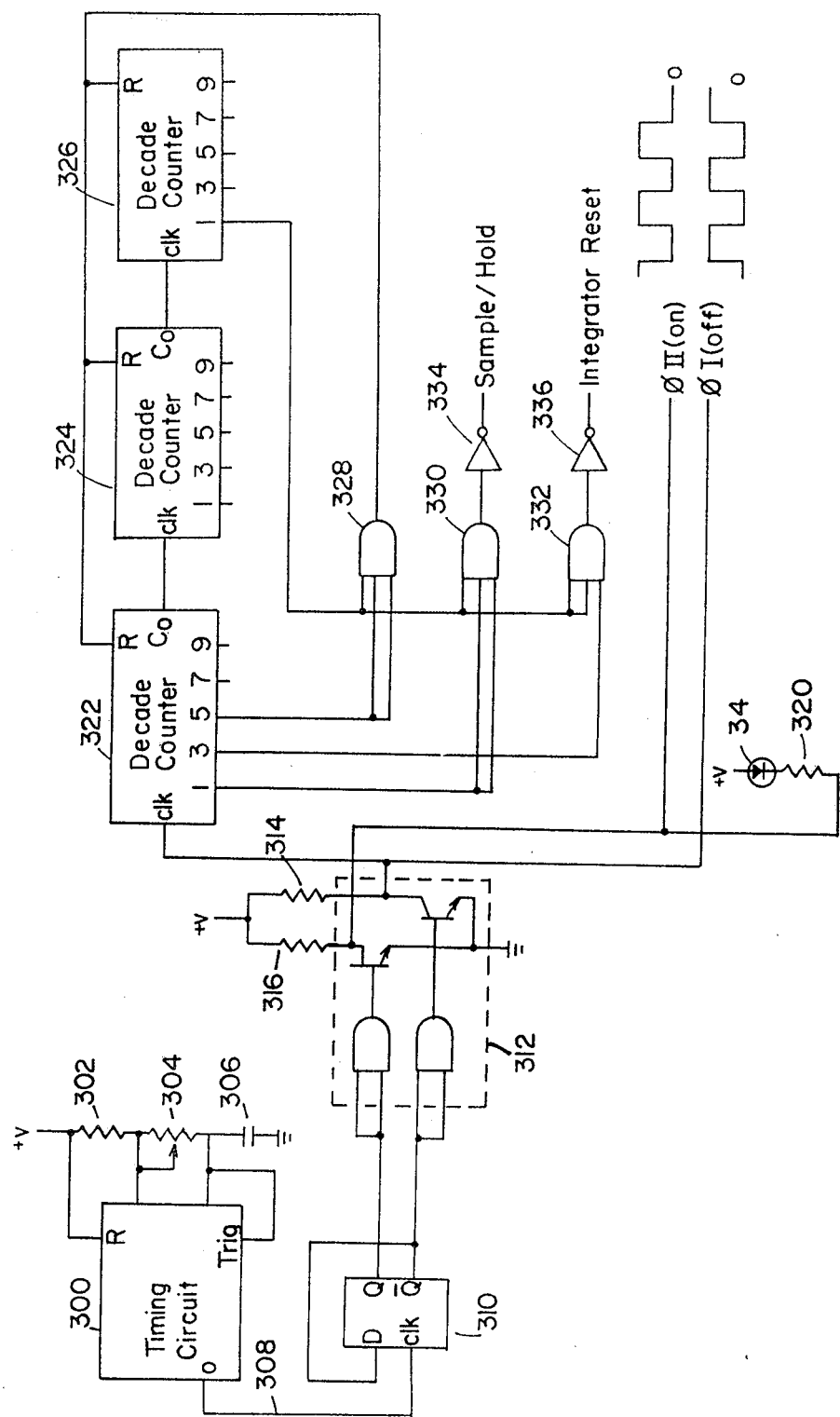
FIGS. 9-14 are schematic diagrams of electronic circuitry for implementing the functional block diagram of FIG. 7.

In FIG. 9, there is presented a schematic diagram of circuitry for implementing clock circuit 100 which provides timing signals for the seam tracker signal processing electronics. The clock circuit is built around timing circuit 300 which may, for example, be a type NE555 integrated circuit available from National Semiconductor Corp. Timing circuit 300 as utilized in circuitry of FIG. 9 is connected for astable operation as an oscillator, the free running frequency and the duty cycle both being accurately controlled with external resistor 302, potentiometer 304 and capacitor 306. The output of timing circuit 300 is a non-symmetrical squarewave of constant frequency. The output of timing circuit 300 is applied via line 308 to the clock input of D-type flip-flop 310 connected to "toggle", providing a symmetrical waveform from both the Q and Q outputs of flip-flop 310. The operation frequency selected is one kilohertz.

Both the Q and Q outputs flip-flop 310 are applied to driver circuit 312 which is a CMOS dual periphery driver. The output of each driver is an open collector transistor; accordingly, external resistors 314, 316 are provided as collector loads. The outputs of peripheral driver 312 are designated $\phi$I and $\phi$II. Both signals are squarewaves of one kilohertz frequency, but are 180° out of phase.

The $\phi$II signal from driver 312 is applied to a light emitting diode 34 having a current limiting resistor 320 in series therewith. The $\phi$I signal is applied to a counter comprising cascaded decade counters 322, 324, 326. Each decade counter is advanced on the positive edge of a clock signal applied to its clock input. The counters are cleared to a zero count by a logic "one" on the "R" input. Counters 322, 324, 326 may, for example be CD 4017 CMOS integrated circuits.

Selected outputs from decade counters 322, 324, 326 are connected to logic comprising AND gates 328, 330, 332 to decode a particular count of the counter and generate an output signal for use within the seam tracker signal processing circuitry. In particular, AND gate 332 decodes a count of "103" and generates from inverter 336 the INTEGRATOR RESET signal. AND gate 330 decodes a count of "101" and generates from inverter 334 the SAMPLE/HOLD signal. AND gate 328 decodes a count of "105" and generates the counter reset signal which returns decade counters 322, 324, 326 to their zero count.

Figure 10:
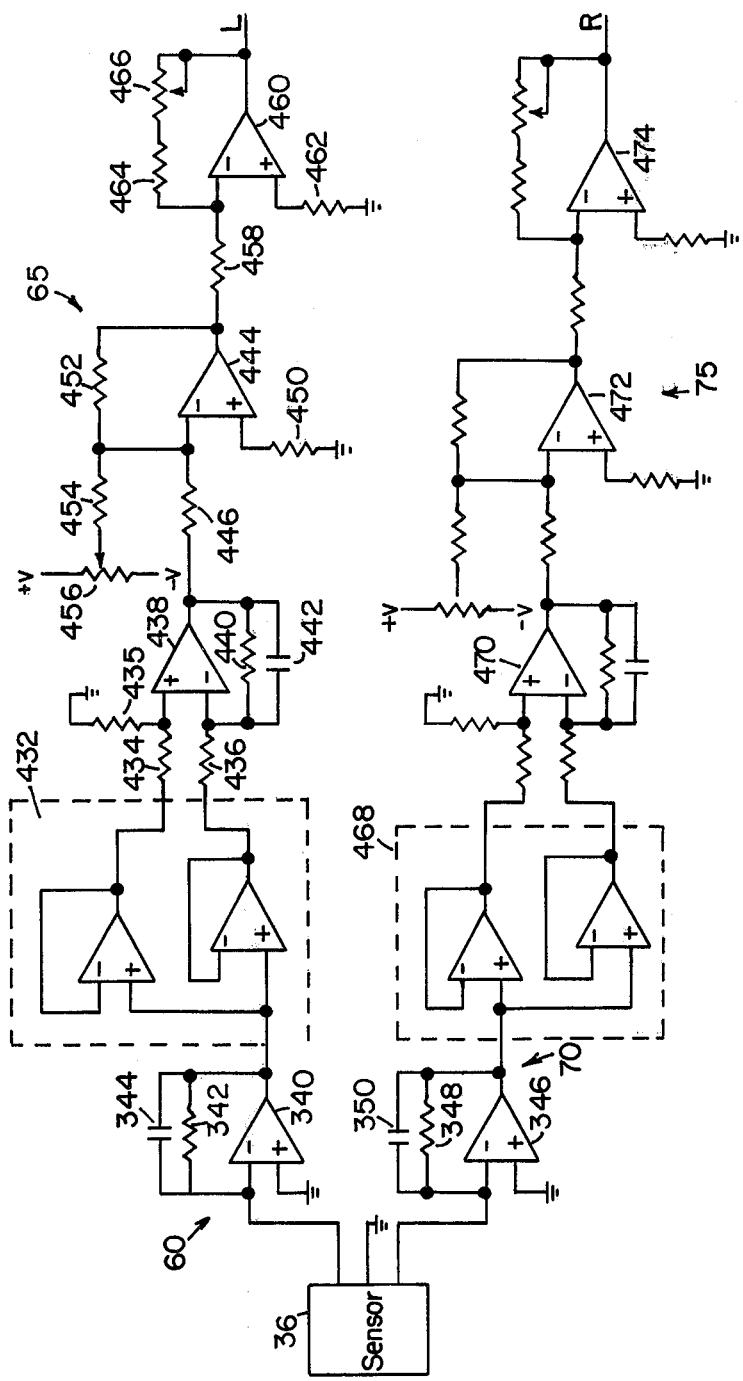

Referring next to FIG. 10, there is presented a schematic diagram for the pre-amplifier circuits 60, 70 and temperature compensation circuits 65, 75 for the LEFT and RIGHT signal processor channels. The LEFT pre-amp circuit comprises an operational amplifier 340 having a feedback network comprising resistor 342 and capacitor 344. RIGHT pre-amplifier 70 similarly comprises operational amplifier 346 and a parallel network including resistor 348 and capacitor 350.

Prior to describing temperature compensation circuits 65 and 75, reference will be made to FIG. 11. The switching circuitry portion of switching amplifiers 80, 90 for each signal processor channel comprises a quad bilateral switch which may be a CD 4066 CMOS integrated circuit. Switch devices 352 and 354 are configured identically in their interconnections within their respective signal processor channel. In both switch devices, the A and C switches receive, as an input, the output of the respective pre-amplifier 60 or 70 through temperature compensation circuits 65, 75. The inputs to the B and D switches of each switch device are grounded. The control input to the A and D switches is the $\phi$I clock, and the control input to the B and C switches is the $\phi$II clock. Accordingly, opening and closing of the A and D switches is alternated with the opening and closing of the B and C switches. The outputs of the A and D switches in device 352 are connected together to form the LEFT A signal and the outputs of the C and D switches in device 352 are connected together to provide the LEFT B signal. Similarly, the A and B switch outputs of device 354 are connected together to form the RIGHT A signal, and the C and D switch outputs are connected together to form the RIGHT B signal.

Figure 11:
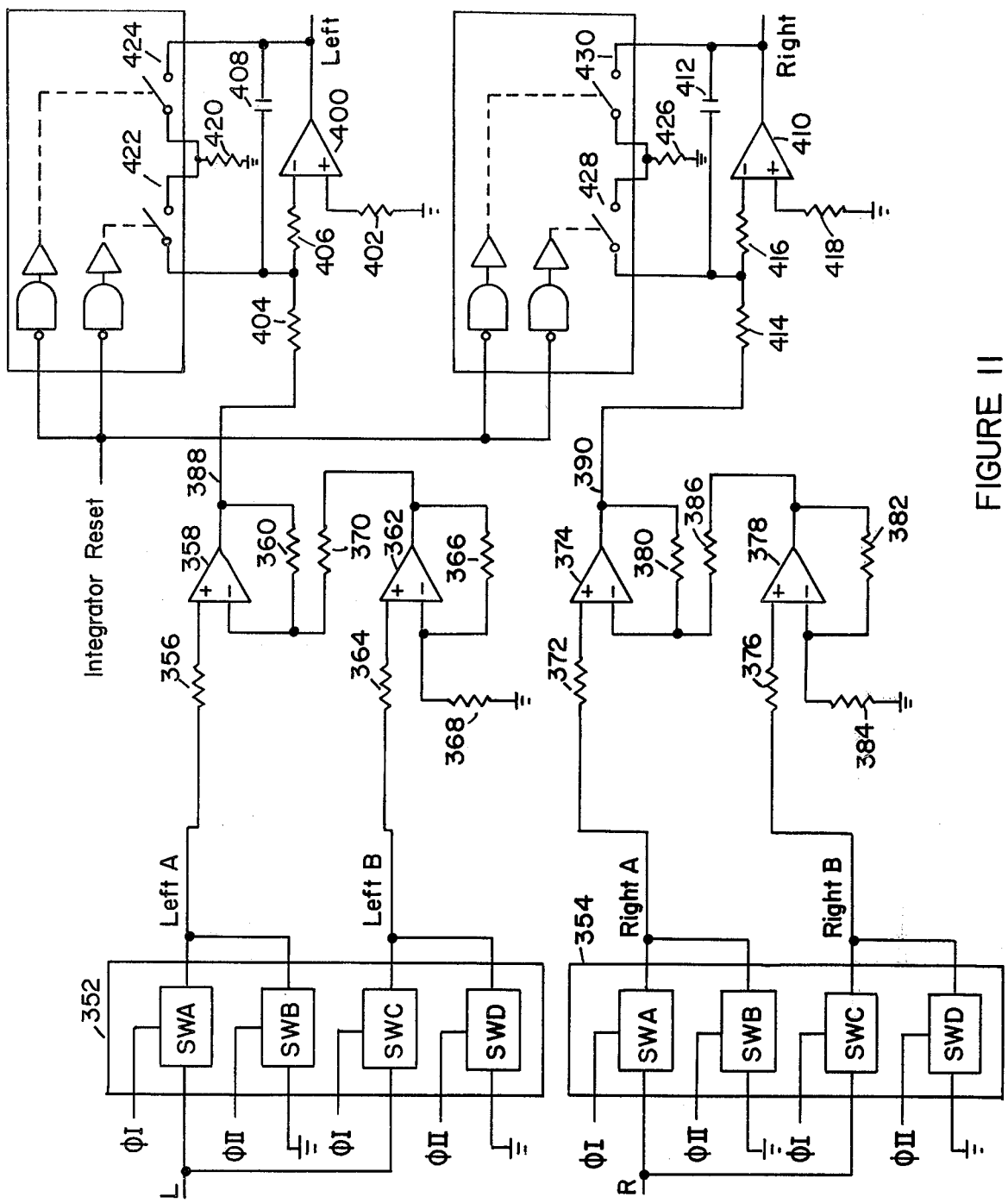

Further shown in FIG. 11 is the differential amplifier portion of switching amplifiers 80, 90. Interconnection between the amplifier section and the switching section is indicated by the LEFT A, B and RIGHT A, B signal designations. As indicated, the LEFT A signal is applied to input resistor 356 connected to the non-inverting input of operational amplifier 358 having a feedback resistor 360 between the output 388 and inverting input. The LEFT B signal is applied to an input resistor 364 connected to operational amplifier 362 having a feedback resistor 366 connected between the output and the inverting input. A resistor 368 is connected between ground and the inverted input. A resistor 370 interconnects the output of operational amplifier 362 and the inverting input of operational amplifier 358. Output 388 of operational amplifier 358 serves as the output for the switching amplifier.

The amplifier portion of the switching amplifier for the RIGHT signal processing channel is identical to that for the LEFT signal processing channel. The RIGHT A signal from device 354 is applied to input resistor 372 connected to the non-inverting input of operational amplifier 374. A feedback resistor 380 interconnects the inverting input and output of operational amplifier 374. The RIGHT B signal is applied to the non-inverting input of operational amplifier 378 through an input resistor 376. A feedback resistor 382 interconnects the output and inverting input of operational amplifier 378, with a resistor 384 being connected between the inverting input and ground. The output of operational amplifier 378 and the inverting input of operational amplifier 374 are interconnected via resistor 386. The output for the RIGHT switching amplifier is the output 390 of operational amplifier 374.

With continued reference to FIG. 11, the LEFT switching differential amplifier output 388 is applied to a LEFT integrator circuit built around an operational amplifier 400. The integrator circuit is configured with a resistor 402 being connected between the non-inverting input of operational amplifier 400 and ground. Input to the integrator circuit is via resistor 404 which further connects to an input resistor 406 connected to the inverting input of operational amplifier 400. A feedback loop comprising capacitor 408 is connected between the output of operational amplifier 400 and the junction formed by the interconnection of resistors 404 and 406.

The RIGHT integrator circuit is identical to the LEFT integrator and includes an operational amplifier 410 having a feedback capacitor 412. The output 390 of the RIGHT switching differential amplifier is applied to the integrator via resistor 414 which interconnects with input resistor 416. The non-inverting input of operational amplifier 410 is connected to ground through resistor 418.

Both the LEFT and RIGHT integrator circuits are resetable upon the occurrence of INTEGRATOR RESET from the timing circuit of FIG. 9. The LEFT integrator circuit is reset by discharging capacitor 408 through resistor 420, which is accomplished by closure of switches 422, 424. Similarly, the RIGHT integrator circuit is reset by discharging capacitor 412 through resistor 426 accomplished by closure of switches 428, 430. Switches 422, 424 and switches 428, 430 are part of a DG 181 integrated circuit.

The output of the LEFT and RIGHT integrator circuits is generated by reason of the periodic pulsing of the electromagnetic radiation source 34 to establish a periodic sampling and updating of position information, which is accumulated and retained by the integrator. Each step in the stairstep waveform of the integrator circuit outputs corresponds to the electromagnetic radiation source signal level during a respective sample interval. Utilization of the switching differential amplifier provides enhancement of noise rejection by removing the noise contribution to the LEFT and RIGHT sensor channel signals accumulated in the integrators.

To more fully explain, consider that with a pulsed electromagnetic radiation source, the LEFT and RIGHT channel signals from sensor 36 will themselves be a pulse waveform. If no noise is present (e.s., ambient light from the torch), the amplitude of each signal channel pulse would be a function of the amount of radiant flux impinging upon the sensor surface. However, for a given position of the optical center of power when noise is present, there is a contribution to the channel signal amplitude. Moreover, since noise will be relatively constant, there is a rise of the baseline of the overall channel signal because the noise and source signal components are additive. If the composite information signal and noise components were applied directly to differential amplifier 130 and summing amplifier 140, the noise component and its fluctuations would alter the resulting SEAM TRACK control signal. However, through the utilization of the switching differential amplifier and integrator circuit combination, noise rejection is enhanced by removal of noise contribution from the LEFT and RIGHT channel signals prior to their application to the differential and summing amplifiers.

Briefly, noise rejection is achieved by utilizing the switching differential amplifier to permit the capacitor in each integrator to be charged with the respective channel signal and noise during the time in which the electromagnetic radiation source is turned "on". During electromagnetic radiation source "off" time, the switching differential amplifier applies to the integrator input a negative potential equal to the noise level on the signal channel to discharge the capacitor and lower the voltage thereon, such that the noise contribution to the channel signal previously accumulated on the integrator circuit capacitor is cancelled, leaving only the information signal value.

Noise cancellation in the aforementioned manner is achieved by the circuitry shown in FIG. 11. During electromagnetic radiation source "on" time, the LEFT channel signal is applied via switch A to resistor 356. The signal output comprises the source radiation produced signal and noise. Simultaneously, switch D applies ground potential to resistor 364, which places the output of operational amplifier 362 at virtual ground. With the inverting input grounded, the output 388 of operational amplifier 358 amplifies the signal present at the non-inverting input. Similar operation exists for the RIGHT signal channel. Thus, when the electromagnetic radiation source is turned "on", the signal applied to the LEFT and RIGHT integrator circuits for charging the respective capacitor in each is a combination of the source signal and noise.

During the electromagnetic radiation source "off" time, the signal output from preamplifiers 60 and 70 consist of only the channel noise. During the "off" time the preamplifier outputs are routed through switch C of the switch devices. This places the channel noise signal on the non-inverting input of operational amplifiers 362 and 378. Simultaneously, the non-inverting inputs of operational amplifiers 358 and 374 are grounded through the B switches and switch devices 352, 354. Accordingly, output 388 of operational amplifier 358 outputs a negative voltage proportional to the LEFT channel noise. Similarly, output 390 of operational amplifier 374 outputs a negative voltage proportional to the RIGHT channel noise. Application of these negative potentials to their respective integrator circuits causes capacitors 408, 412 to be discharged in an amount proportional to the channel noise.

Referring now back to FIG. 10 with an understanding of switching amplifiers 80, 90, the temperature compensating circuits 65, 75 are provided to afford more dynamic range for the signal processing circuitry. Temperature variations of the seam tracker head assembly will have the effect of varying position sensor output in the same fashion as does ambient light. Switching differential amplifiers 80, 90 will act to cancel such effects. In cancelling a high DC level, the gain of amplifiers 358, 362, 374 and 378 must be kept low to prevent an out of range condition. A low gain, however, reduces the range for dynamic signals.

Circuits 65, 75 references any AC input to the signal processing circuitry to zero, left channel temperature compensating circuit 65 includes a dual operational amplifier 432 configured as a dual non-inverting buffer with a common input, which offers a very high input impedance to preamplifiers 60, 70. The two identical outputs of buffer 432 are applied through resistor combination 434, 435 and resistor 436 to operational amplifier 438 configured as a differential amplifier having a very high common mode rejection ratio (i.e. greater than 100 db). A feedback network comprising resistor 440 and capacitor 442 is included.

If a DC signal is input to buffer 432, the difference in signal levels input to differential amplifier 438 will be zero and the output from amplifier 438 will be very close to zero. Accordingly, any constant DC level (i.e. offset, constant illumination, etc.) will be cancelled by the common mode rejection ratio of amplifier 438.

If a signal other than a constant DC level is injected into the circuitry, the capacitive reactance of capacitor 442 will unbalance the differential amplifier 438 and there will be a signal output which is referenced to zero.

The signal from amplifier 438 is applied to an amplifier 444 via resistor 446. The non-inverting input of amplifier 444 is tied to ground through resistor 450. Amplifier 444 is provided with a variable gain by a feedback network comprising fixed resistors 452 and 454 and potentiometer 456. The variable gain is adjustable to compensate for unequal gains in amplifiers 358 and 362 of the switching amplifier 80.

The output of amplifier 444 is applied to an input resistor 458 connected to the inverting input of operational amplifier 460. The non-inverting input is connected to resistor 462. A feedback network comprising resistor 464 and potentiometer 466 connects between the output and inverting input of amplifier 460. Amplifier 460 is provided to remove offset in the gain stage (i.e. amplifier 444).

Temperature compensation circuit 75 for the RIGHT signal processing channel is identical to circuit 65. Briefly, circuit 75 includes a buffer 468, a differential amplifier 470, a gain stage amplifier 472, and an offset removal amplifier 474.

Figure 12:
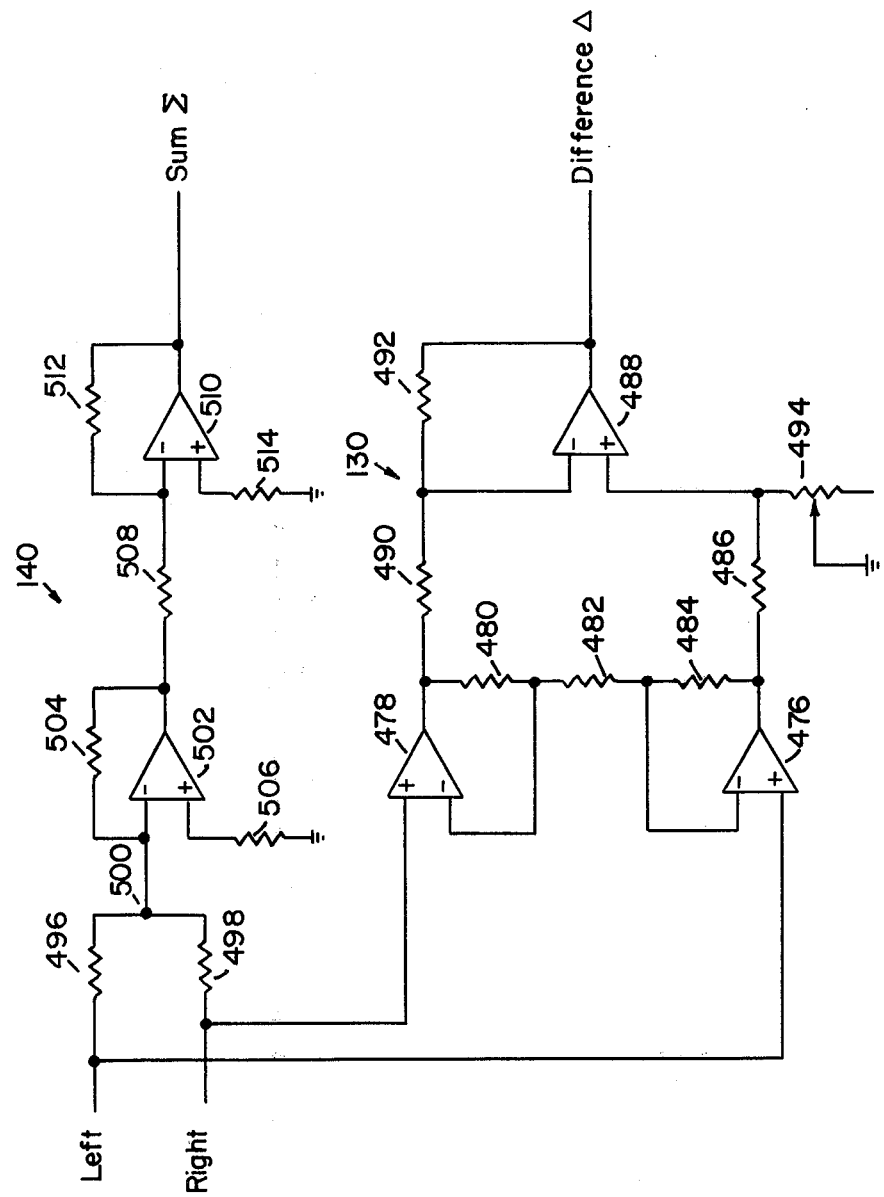

The LEFT and RIGHT channel signals from integrator circuits 110, 120 shown in detail in FIG. 11 are applied to the sum and difference circuitry in FIG. 12. The difference circuitry comprises operational amplifiers 476, 478, which receive the LEFT and RIGHT channel signals, respectively, on the non-inverting input. A series resistor combination of resistors 480, 482 and 484 connect between the outputs of operational amplifiers 476, 478. The inverting input of operational amplifier 476 is connected at the junction formed by the interconnection of resistors 482, 484, and the inverting input of operational amplifier 478 is connected to the node formed by the interconnection of resistors 480, 482. The output of operational amplifier 476 is applied via resistor 486 to the non-inverting input of operational amplifier 488. The output of operational amplifier 478 is applied via resistor 490 to the inverting input of operational amplifier of 488. A feedback resistor 492 and a CMRR differential balance potentiometer 494 are further included in the difference circuitry.

The LEFT and RIGHT channel signals are applied through input resistors 496, 498 to a summing node 500 electrically connected to the inverting input of an operational amplifier 502 having a feedback resistor 504 and a grounding resistor 506 connected to the non-inverting input. The output from operational amplifier 502 connects through resistor 508 to the inverting input of operational amplifier 510 which includes a feedback resistor 512 and a grounding resistor 514 connected to the non-inverting input.

Figure 13:
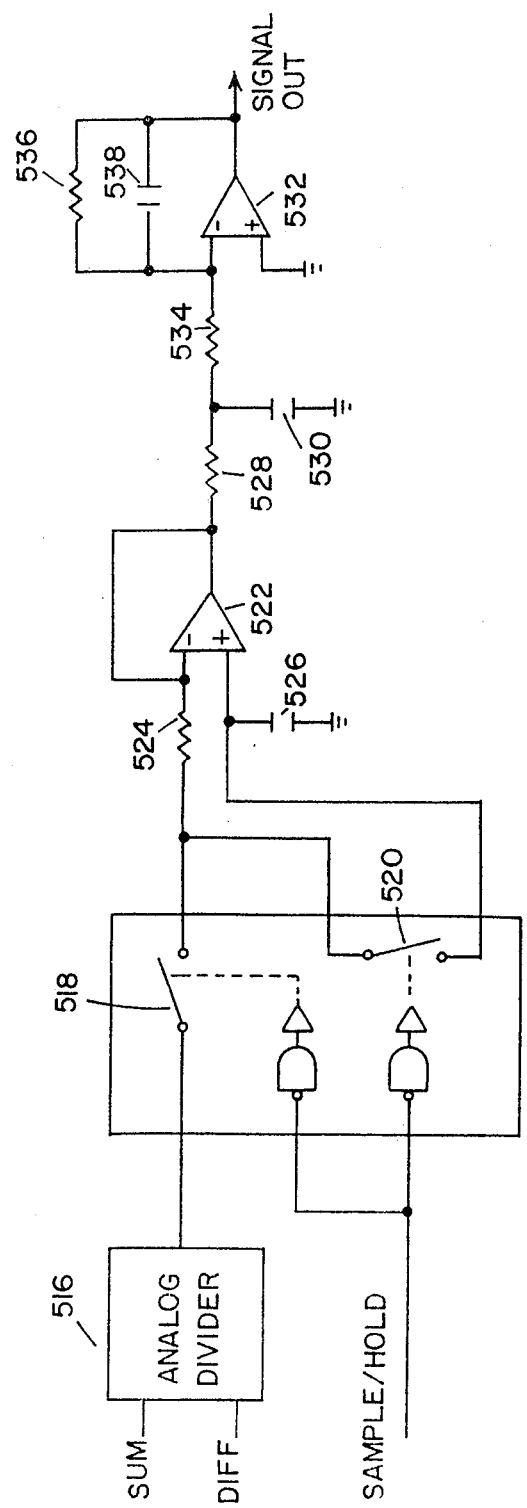

The SUM and DIFFERENCE signals developed from the LEFT and RIGHT channel signals are applied to an analog divider 516 in FIG. 13, which may, for example, be a Burr Brown Research Corporation type 4291 device. The output of the analog divider is applied to a switch 518 controlled by the SAMPLE/HOLD signal from the timing circuitry of FIG. 9. Simultaneous with the closure of switch 518 is the closure of switch 520. Simultaneous closing of both switches places the analog divider output signal on both the inverting and non-inverting inputs of operational amplifier 522, which is configured as a buffer amplifier. The analog divider output signal is applied to the inverting input via an input resistor 524. Connected between ground and the non-inverting input of operational amplifier 522 is capacitor 526 which is charged when switches 518, 520 are closed. When the switches are opened, the circuitry acts as a buffer amplifier; but when the switches are opened, the circuitry goes into a hold mold, maintaining the output signal by reason of the stored value on the capacitor.

The output of the sample and hold circuitry is applied to a low pass filter comprising resistor 528 and capacitor 530. The signal passing through the filter is applied to an output amplifier comprising operational amplifier 532 receiving an input signal via input resistor 534 and having a feedback network consisting of resistor 536 and capacitor 538. The signal from the output amplifier is the SIGNAL OUT signal.

Figure 14:
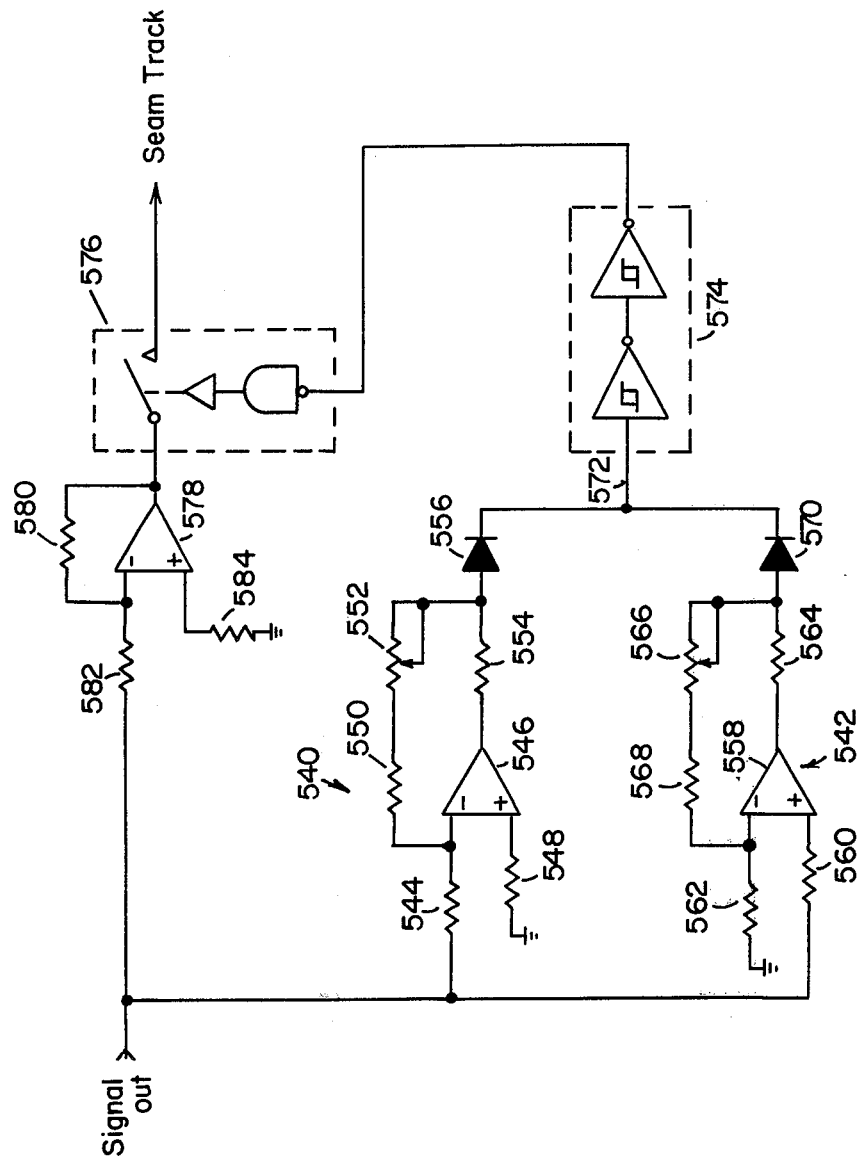

Referring now to FIG. 14, the SIGNAL OUT signal is applied to inverting and non-inverting variable gain amplifiers, generally denoted 540 and 542, respectively. Inverting amplifier 540 receives SIGNAL OUT via input resistor 544. An operational amplifier 546, with its non-inverting input connected to a resistor 548, has a feedback loop comprising resistor 550, potentiometer 552 and resistor 554, which provides for a variable gain. The output from amplifier 540 is taken at the junction of resistor 554 and potentiometer 552 and applied to a diode 556.

Non-inverting amplifier 542 is built around operational amplifier 558, and SIGNAL OUT is applied to input resistor 560 which is connected to the non-inverting input thereof. The inverting input is connected to resistor 562. A feedback loop including resistor 564, potentiometer 566, and resistor 568 provides the variable gain. The output of amplifier 542 is applied to diode 570.

The cathodes of diodes 556, 570 are connected together, and in this arrangement, only the positive output of amplifiers 540, 542 is passed via connection 572 to Schmitt trigger device 574.

The gain of amplifiers 540, 542 are adjusted to the maximum variation in SIGNAL OUT expected to exist in normal operation of the seam tracker. If the servo loop of the seam tracker is functioning properly, SIGNAL OUT should remain very close to zero at all times. Error will typically result due to reflections from objects in the weld seam which cause the seam to be unsymmetrical, as for example, weld spatter or arc burns. These reflections will produce sudden apparent lateral offset of a relatively great extent as compared to normal joint run-out.

If a variation in SIGNAL OUT occurs which exceeds the tolerance of normal operation, the output of either amplifier 540 or 542, depending upon the polarity of the signal, will apply a positive five volts DC to Schmitt trigger 574 which generates a logic "1" at its output. This condition at the output of device 574 opens analog switch 576, which provides a buffered SIGNAL OUT as SEAM TRACK. Buffering of SIGNAL OUT is by an operational amplifier 578 having a feedback resistor 580, an input resistor 582, and an input grounding resistor 584. Opening of switch 576 puts the seam tracker servo loop on "hold" until head assembly 30 has passed over the location of the error source.

The foregoing description of the invention has been directed to a particular preferred embodiment for purposes of explanation and illustration. It will be apparent, however, to those skilled in this art that many modifications and changes in the apparatus may be made without departing from the essence of the invention. It is the intention in the following claims to cover all equivalent modifications and variations as fall within the scope of the invention.

What is claimed is:

1. A welding system for welding along a weld seam, comprising:
    a welding torch;
    a drive mechanism for advancing the welding torch along the weld seam;
    a controllable lateral torch drive mechanism for driving the welding torch laterally of the weld seam;
    means for producing reflected electromagnetic radiation from the weld seam in an unimaged spatial distribution having an optical center of power functionally related to the lateral positioning of the welding torch relative to the weld seam; and
    means for sensing a shift in position of the optical center of power of the reflected electromagnetic radiation produced by a variation in the spatial distribution of the reflected radiation resulting from lateral deviation of the welding torch relative to the weld seam and producing a control input to the lateral torch drive mechanism in response thereto.

2. The apparatus of claim 1 wherein the sensing means comprises a lateral cell position sensor.

3. The apparatus of claim 1 wherein the sensing means comprises a lateral cell position sensor providing differential electrical output signals representing the position of the optical center of power of the spatial distribution of electromagnetic radiation over the face of the cell.

4. The apparatus of claim 3 wherein the sensing means further comprises means for processing the differential electrical output signals from the lateral cell position sensor to produce an electrical signal representative of torch position relative to the weld seam.

5. The apparatus of claim 4 wherein the signal processing means comprises:
    first and second signal processing channel inputs for connection to the differential electrical output signals of the lateral cell position sensor, each channel input including a noise rejection circuit;
    a summing amplifier connected to each noise rejection circuit;
    a difference amplifier connected to each noise rejection circuit; and
    an analog divider connected to the summing amplifier and the difference amplifier for producing a signal proportional to a ratio of the sum and difference of the differential electrical output signals.

6. Apparatus for guiding a welding torch to track a weld seam, comprising:
    an electromagnetic radiation source for directing an unfocused beam of electromagnetic radiation onto the weld seam;
    a lateral cell position sensor receiving unimaged electromagnetic radiation reflected from the weld seam for sensing lateral position deviations of the welding torch relative to the weld seam; and
    means connected to the sensor for producing a signal representative of torch position with respect to the center of the weld seam.

7. The apparatus of claim 6 wherein the sensor produces differential output signals; the difference therebetween being indicative of the position of the welding torch relative to the weld seam.

8. The apparatus of claim 7 wherein the signal producing means comprises a two input channel signal processor with each input channel receiving one of the differential output signals from the sensor.

9. The apparatus of claim 8 wherein the signal processor comprises:
    a clock circuit generating a timing signal that periodically pulses the electromagnetic radiation source to turn it on; and
    means responsive to the timing signal for accumulating a value during source ontime representative of the source radiation contribution and the channel noise contribution in each channel input signal, and for reducing the accumulated value during source off-time by an amount representative of the existing noise contribution.

10. A welding system for welding along a weld seam, comprising:
    a welding torch;
    a drive mechanism for advancing the welding torch along the weld seam;
    a controllable lateral torch drive mechanism for driving the welding torch laterally of the weld seam;
    a source of electromagnetic radiation disposed proximate the welding torch and advanced along therewith, the electromagnetic radiation source directing a narrow beam of unfocused electromagnetic radiation from the weld seam in an unimaged spatial distribution having an optical center of power functionally related to the lateral positioning of the welding torch relative to the weld seam;
    a position sensor spaced from the electromagnetic radiation source and oriented to receive reflected electromagnetic radiation from the weld seam for detecting the optical center of power of the reflected electromagnetic radiation and sensing a shift in position of the optical center of power produced by a variation of the reflected radiation resulting from lateral deviation of the welding torch relative to the weld seam, the position sensor providing an electrical output signal indicative of the position of the optical center of power; and
    signal processing circuitry receiving the electrical output signal of the position sensor and producing in response thereto a control input to the lateral torch drive mechanism.

11. The apparatus of claim 10 wherein the position sensor provides differential electrical output signals, the difference in amplitude between the signals being representative of the position of the optical center of power of the spatial distribution of the unimaged reflected electromagnetic radiation from the weld seam.

12. The apparatus of claim 11 wherein the signal processing circuitry comprises:
    first and second signal input channels, each channel input receiving one of the position sensor differential electrical output signals;
    a difference amplifier for developing an analog signal representative of the difference between the position sensor output signals;
    a summing amplifier for developing an analog signal representative of the sum of the position sensor output signals;
    an analog divider receiving the analog sum and difference signals as inputs and developing an output signal representative of the ratio of the difference signal to the sum signal; and
    means for applying the analog divider output signal to an input on the lateral torch drive mechanism.

13. The apparatus of claim 11 wherein the signal processing circuitry comprises:
- a clock circuit producing a clock signal having a symmetrical waveform;
- means for applying the clock signal as a driving signal to the electromagnetic radiation source to turn the source on and off in a repeating cycle;
- first and second input channels, each channel input receiving one of the position sensor differential electrical output signals;
- a first switching amplifier connected to the first channel input and having an output, the switching amplifier being responsive to the clock circuit signal to produce a first signal of one polarity as its output when the electromagnetic radiation source is turned on and to produce a second signal of opposite polarity as its output when the electromagnetic radiation source is turned off;
- a second switching amplifier connected to the second channel input and having an output, the switching amplifier being responsive to the clock circuit signal to produce a first signal of one polarity at its output when the electromagnetic radiation source is turned on and to produce a second signal of opposite polarity at its output when the electromagnetic radiation source is turned off;
- an integrator circuit connected to the output of the first switching amplifier for accumulating a value proportional to the first output signal level and reducing the accumulated value by an amount proportional to the second output signal level, the remaining accumulated value being provided at the output of the integrator;
- an integrator circuit connected to the output of the second switching amplifier for accumulating a value proportional to the first output signal level and reducing the accumulated value by an amount proportional to the second output signal level, the remaining accumulated value being provided at the output of the integrator;
- a difference amplifier connected to the outputs of the integrator circuits, the difference amplifier developing an analog signal representative of the difference between the remaining accumulated values of the integrators;
- a summing amplifier connected to the outputs of the integrator circuits, the summing amplifier developing an analog signal representative of the sum of the remaining accumulated values of the integrators;
- an analog divider receiving the analog sum and difference signals as inputs and developing an output signal representative of the ratio of the difference signal to the sum signal; and
- means for applying the analog divider output signal to an input on the lateral torch drive mechanism.

14. Apparatus for tracking a weld seam and providing guidance of a welding torch, which comprises:
- a drive mechanism for moving the welding torch bidirectionally across the weld seam;
- a housing mounted in fixed relation to the welding torch for movement therewith;
- a light source carried in the housing, the light source emitting a beam of unfocused light directed onto the weld seam;
- a position sensor carried in the housing and spaced apart from the light source for receiving unimaged light reflected from the weld seam and producing first and second electrical output signals in response to the spatial distribution of the reflected light falling on the sensor;
- signal processing circuitry connected to the position sensor for developing from the first and second electrical output signals a signal representative of the lateral position of the welding torch relative to the weld seam; and
- means for applying the torch lateral position signal as an input to the torch drive mechanism.

15. Apparatus for controlled movement of a welding torch to weld along a weld seam, which comprises:
- a reversible drive motor linked to the welding torch for moving the same bidirectionally across the weld seam;
- a torch oscillator providing an oscillatory output signal for directing movement of the torch across the weld seam;
- a torch position sensor linked to the drive motor for providing an output signal indicative of torch position relative to the center of oscillation thereof;
- a manually adjustable device for providing an electrical signal effect to drive the motor and permit initial centering of the welding torch to the weld seam; and
- a non-contact optical seam tracker for providing an output signal indicative of the center of torch oscillatory movement relative to the weld seam, the seam tracker sensing lateral positioning of the torch relative to the weld seam using a beam of light reflected from the weld seam;
- a summing circuit for receiving as control inputs to the torch drive mechanism the torch oscillator signal, the torch position sensor signal, the torch center adjustment signal, and the seam tracker signal and producing therefrom a motor control signal; and
- a power driver for applying electrical power to the drive motor in response to the motor control signal.

16. A method of non-contact tracking of a weld seam by a welding torch controlled by a drive mechanism comprising the steps of:
- producing an unimaged spatial distribution of electromagnetic radiation reflected from the weld seam having an optical center of power functionally related to the lateral position of the welding torch relative to the weld seam;
- receiving the unimaged electromagnetic radiation reflected from the weld seam with a sensor that detects a shift in position of the optical center of power that results from lateral deviation of the welding torch relative to the weld seam and produces an output signal indicative of a shift in center of power position; and
- processing the output signal from the sensor to develop a control signal for input to the torch drive mechanism.

17. A welding system for welding along a weld seam, comprising:
- a welding torch;
- a drive mechanism for advancing the welding torch along the weld seam;
- a controllable lateral drive torch drive mechanism for moving the welding torch laterally of the weld seam;
- means for producing reflected electromagnetic radiation from the weld seam;

means for producing reflected electromagnetic radiation from the weld seam in an unimaged spatial distribution having an optical center of power functionally related to the lateral positioning of the welding torch relative to the weld seam; and a single element phototransducer for sensing a shirt in position of the optical center of power of the reflected electromagnetic radiation produced by a variation in the spatial distribution of the reflected radiation resulting from lateral deviation of the welding torch relative to the weld seam and producing a control input to the lateral torch drive mechanism in response thereto.

18. A welding system for welding along a weld seam, comprising:

a welding torch;

a drive mechanism for advancing the welding torch along the weld seam;

a controllable lateral drive torch drive mechanism for moving the welding torch laterally of the weld seam;

means for producing reflected electromagnetic radiation from the weld seam;

a source of electromagnetic radiation disposed proximate the welding torch and advanced along therewith, the electromagnetic radiation source directing a narrow beam of unfocused electromagnetic radiation from the weld seam in an unimaged spatial distribution having an optical center of power functionally related to the lateral positioning of the welding torch relative to the weld seam;

a single element phototransducer spaced from the electromagnetic radiation source and oriented to receive reflected electromagnetic radiation from the weld seam for detecting the optical center of power of the reflected electromagnetic radiation and sensing a shift in position of the optical center of power produced by a variation of the reflected radiation resulting from lateral deviation of the welding torch relative to the weld seam, the transducer providing an electrical output signal indicative of the position of the optical center of power; and signal processing circuitry receiving the electrical output signal of the transducer and producing in response thereto a control input to the lateral torch drive mechanism.

* * * * *